US012749329B2

(12) United States Patent
Ellendula et al.

(10) Patent No.: US 12,749,329 B2
(45) Date of Patent: Sep. 29, 2026

(54) ANOMALY DETECTION IN DOCUMENTS WITH VISUAL CUES

(71) Applicant: Oracle Financial Services Software Limited, Goregaon (IN)

(72) Inventors: Krishna Sameera Ellendula, Sangareddy (IN); Utkarsh Sharma, Mumbai (IN); Veresh Jain, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 559 days.

(21) Appl. No.: 18/342,165

(22) Filed: Jun. 27, 2023

(65) Prior Publication Data

US 2025/0005953 A1 Jan. 2, 2025

(51) Int. Cl.

*G06V 30/418* (2022.01)
*G06T 7/00* (2017.01)
*G06V 10/28* (2022.01)
*G06V 10/40* (2022.01)
*G06V 10/75* (2022.01)

(52) U.S. Cl.

CPC .......... *G06V 30/418* (2022.01); *G06T 7/0002* (2013.01); *G06V 10/28* (2022.01); *G06V 10/40* (2022.01); *G06V 10/751* (2022.01); *G06T 2207/30176* (2013.01)

(58) Field of Classification Search

CPC .... G06V 30/418; G06V 10/40; G06V 10/751; G06V 10/28; G06T 7/0002; G06T 2207/30176

See application file for complete search history.

(56) References Cited

U.S. PATENT DOCUMENTS

| | | | | |
|---|---|---|---|---|
| 10,475,174 | B2 * | 11/2019 | Lim et al. | G06T 7/194 |
| 2017/0220857 | A1 * | 8/2017 | Szostak | G06K 9/00 |
| 2022/0198640 | A1 | 6/2022 | Gupte et al. | |

OTHER PUBLICATIONS

Gebhardt et al., "Document Authentication Using Printing Technique Features and Unsupervised Anomaly Detection", 12th International Conference on Document Analysis and Recognition, Available online at: https://ieeexplore.ieee.org/abstract/document/6628667, Aug. 2013, pp. 479-483.

(Continued)

*Primary Examiner* — Vu Le
*Assistant Examiner* — Matthew James Bodnark
(74) *Attorney, Agent, or Firm* — Kilpatrick Townsend & Stockton LLP

(57) ABSTRACT

Techniques are disclosed for understanding the visual structure and patterns of documents and detecting anomalies in data of the documents based on the understanding of the visual structure and patterns of the documents. In one aspect, a computer-implemented method is provided that includes accessing a set of documents, converting the set of documents to a set of images in a binary format, generating a common feature template based on the set of images, comparing each image from the set of images to the common feature template to identify images with at least one anomalous feature, and outputting the images with at least one anomalous feature.

20 Claims, 14 Drawing Sheets
(8 of 14 Drawing Sheet(s) Filed in Color)

(56) References Cited

OTHER PUBLICATIONS

Hegel et al., "The Law of Large Documents: Understanding the Structure of Legal Contracts Using Visual Cues", Available online at: https://arxiv.org/pdf/2107.08128.pdf, Jul. 2021, 9 pages.
Megahed et al., "Handwriting Forgery Detection Based on Ink Colour Features", Available online at: https://www.researchgate.net/profile/Sondos-Fadl/publication/324728079_Handwriting_forgery_detection_based_on_ink_colour_features/links/5ae1545c458515c60f65fd69/Handwriting-forgery-detectionbased-on-ink-colour-features.pdf, Nov. 2017, 6 pages.
Noce et al., "Combining Textual and Visual Features to Identify Anomalous User-generated Content", International Journal of Computational Linguistics and Applications, vol. 6, No. 2, Available online at: https://www.gelbukh.com/ijcla/2015-2/IJCLA-2015-2-pp-159-175-Combining-Textual-and-Visual-Features.pdf, Jan. 2015, pp. 159-175.
Tang et al., "Improved Anomaly Detection Based on Image Reconstruction and Global Template Features for Industrial Products", Journal of Physics: Conference Series, Available online at: https://iopscience.iop.org/article/10.1088/17426596/2166/1/012062/pdf, 2022, pp. 1-7.
Tian et al., "PPT: Anomaly Detection Dataset of Printed Products with Templates", IEEE International Conference on Image Processing (ICIP), Available online at: https://ieeexplore.ieee.org/abstract/document/9897321, Oct. 2022, 2 pages.
Yang et al., "Visual Anomaly Detection for Images: A Survey", Available online at: https://arxiv.org/abs/2109.13157, Sep. 2021, 7 pages.

* cited by examiner

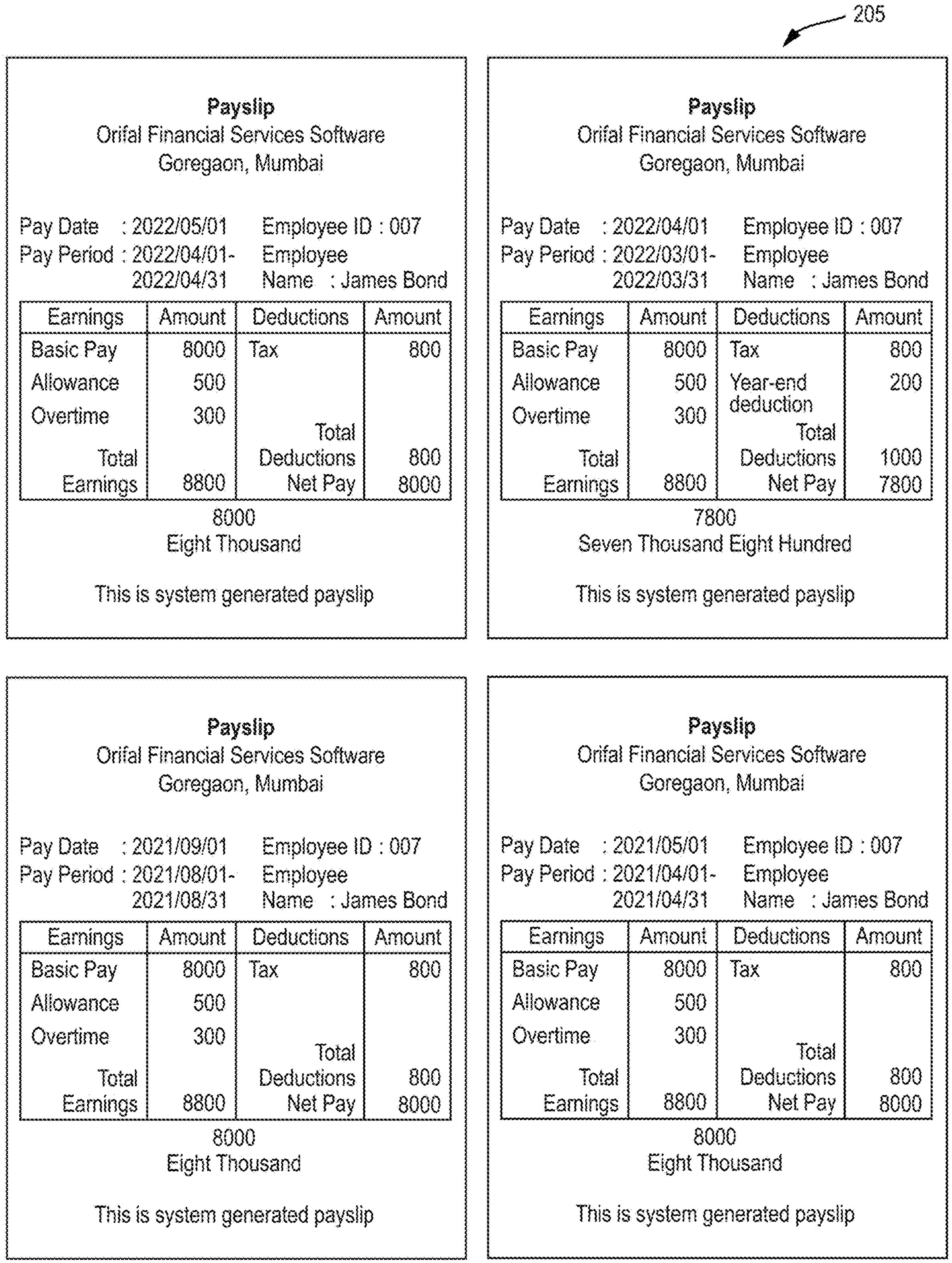

Payslip
Orifal Financial Services Software
Goregaon, Mumbai

Pay Date : 2022/05/01 Employee ID : 007
Pay Period : 2022/04/01-2022/04/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

Payslip
Orifal Financial Services Software
Goregaon, Mumbai

Pay Date : 2022/04/01 Employee ID : 007
Pay Period : 2022/03/01-2022/03/31 Employee Name : James Bond

| Earnings | Amount | Deductions | Amount |
|---|---|---|---|
| Basic Pay | 8000 | Tax | 800 |
| Allowance | 500 | Year-end deduction | 200 |
| Overtime | 300 | | |
| Total Earnings | 8800 | Total Deductions | 1000 |
| | | Net Pay | 7800 |

7800
Seven Thousand Eight Hundred

This is system generated payslip

Payslip
Orifal Financial Services Software
Goregaon, Mumbai

Pay Date : 2021/09/01 Employee ID : 007
Pay Period : 2021/08/01-2021/08/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

Payslip
Orifal Financial Services Software
Goregaon, Mumbai

Pay Date : 2021/05/01 Employee ID : 007
Pay Period : 2021/04/01-2021/04/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

FIG. 2B

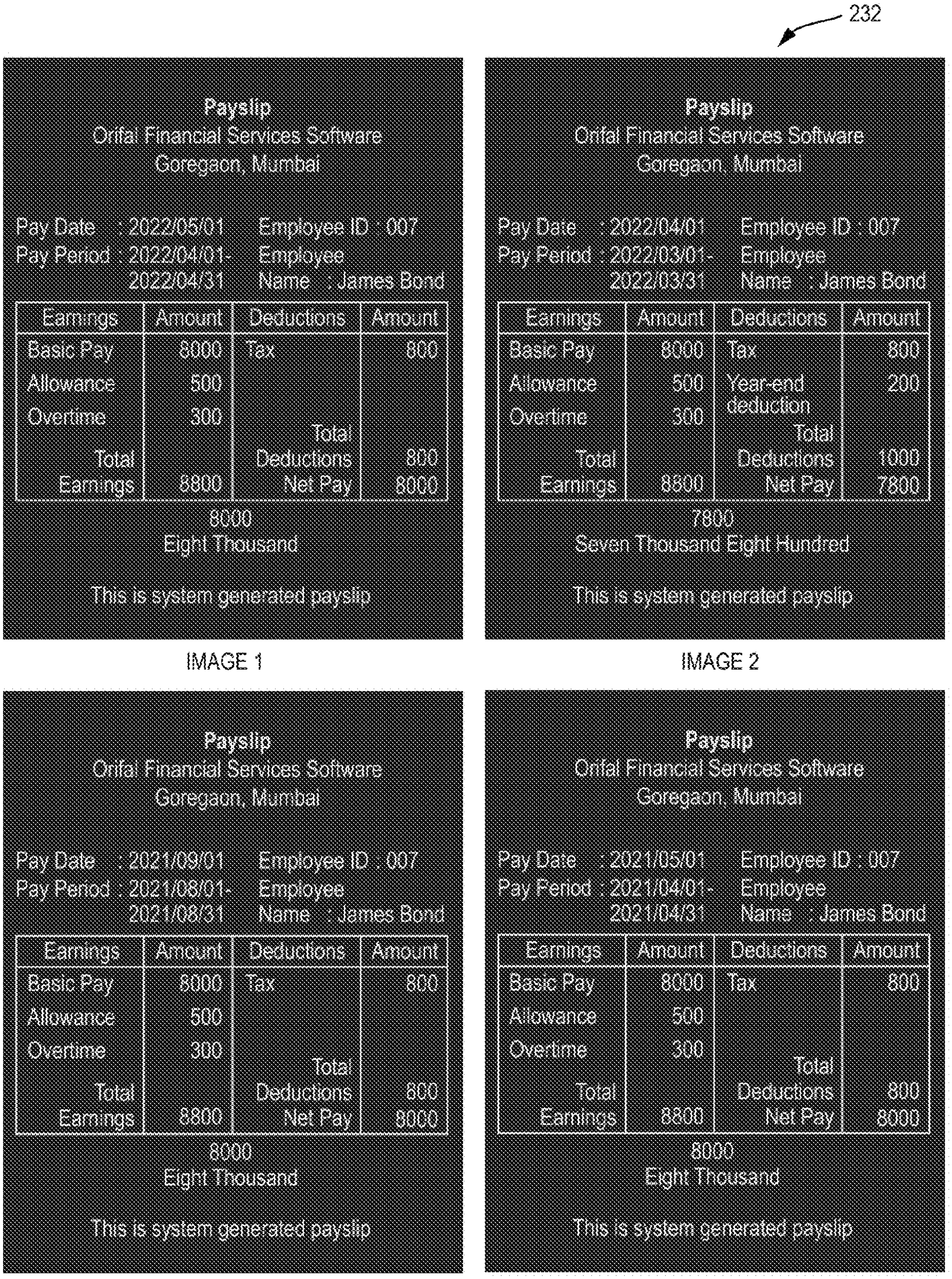

Payslip
Orifal Financial Services Software
Goregaon, Mumbai

Pay Date : 2022/05/01 Employee ID : 007
Pay Period : 2022/04/01-2022/04/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

IMAGE 1

Payslip
Orifal Financial Services Software
Goregaon, Mumbai

Pay Date : 2022/04/01 Employee ID : 007
Pay Period : 2022/03/01-2022/03/31 Employee Name : James Bond

| Earnings | Amount | Deductions | Amount |
|---|---|---|---|
| Basic Pay | 8000 | Tax | 800 |
| Allowance | 500 | Year-end deduction | 200 |
| Overtime | 300 | | |
| Total Earnings | 8800 | Total Deductions | 1000 |
| | | Net Pay | 7800 |

7800
Seven Thousand Eight Hundred

This is system generated payslip

IMAGE 2

Payslip
Orifal Financial Services Software
Goregaon, Mumbai

Pay Date : 2021/09/01 Employee ID : 007
Pay Period : 2021/08/01-2021/08/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

IMAGE 3

Payslip
Orifal Financial Services Software
Goregaon, Mumbai

Pay Date : 2021/05/01 Employee ID : 007
Pay Period : 2021/04/01-2021/04/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

IMAGE 4

FIG. 2D

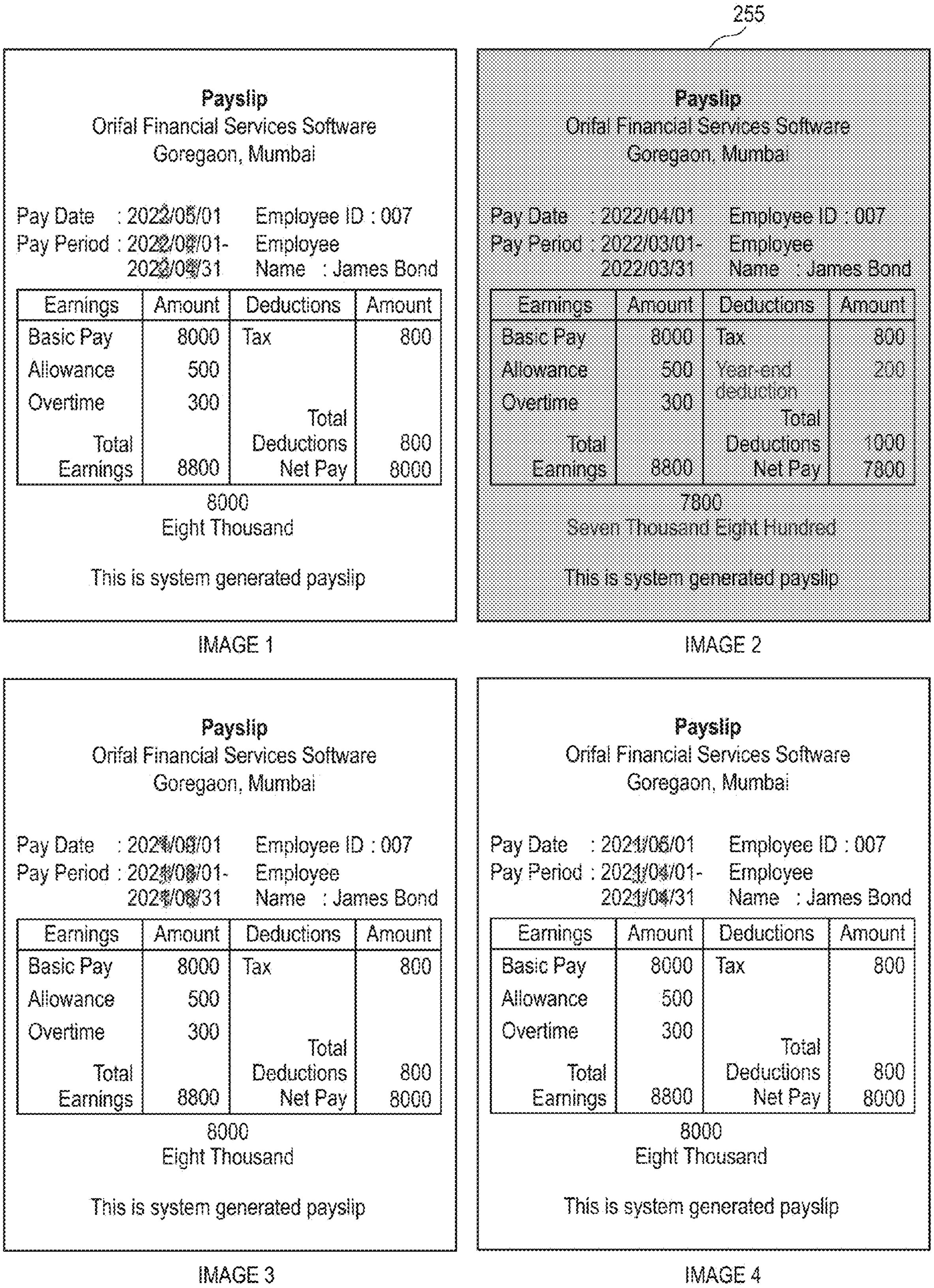

Payslip
Orifal Financial Services Software
Goregaon, Mumbai

Pay Date : 2022/05/01 Employee ID : 007
Pay Period : 2022/04/01-2022/04/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

IMAGE 1

Payslip
Orifal Financial Services Software
Goregaon, Mumbai

Pay Date : 2022/04/01 Employee ID : 007
Pay Period : 2022/03/01-2022/03/31 Employee Name : James Bond

| Earnings | Amount | Deductions | Amount |
|---|---|---|---|
| Basic Pay | 8000 | Tax | 800 |
| Allowance | 500 | Year-end deduction | 200 |
| Overtime | 300 | | |
| Total Earnings | 8800 | Total Deductions | 1000 |
| | | Net Pay | 7800 |

7800
Seven Thousand Eight Hundred

This is system generated payslip

IMAGE 2

Payslip
Orifal Financial Services Software
Goregaon, Mumbai

Pay Date : 2021/08/01 Employee ID : 007
Pay Period : 2021/07/01-2021/07/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

IMAGE 3

Payslip
Orifal Financial Services Software
Goregaon, Mumbai

Pay Date : 2021/05/01 Employee ID : 007
Pay Period : 2021/04/01-2021/04/31 Employee Name : James Bond

| Earnings | Amount | Deductions | Amount |
|---|---|---|---|
| Basic Pay | 8000 | Tax | 800 |
| Allowance | 500 | | |
| Overtime | 300 | | |
| Total Earnings | 8800 | Total Deductions | 800 |
| | | Net Pay | 8000 |

8000
Eight Thousand

This is system generated payslip

IMAGE 4

FIG. 2I

ANOMALY DETECTION IN DOCUMENTS WITH VISUAL CUES

FIELD

The present disclosure relates generally to anomaly detection, and more particularly, to techniques for understanding the visual structure and patterns of documents and detecting anomalies in data of the documents based on the understanding of the visual structure and patterns of the documents.

BACKGROUND

Anomaly detection in data refers to the process of identifying patterns or data points that deviate significantly from the expected or normal behavior within a dataset. Anomalies, also known as outliers, are data points that do not conform to the typical patterns or behaviors observed in the majority of the dataset. The goal of anomaly detection is to identify these unusual data points, which can represent events, behaviors, or measurements that are rare, suspicious, or potentially indicative of a problem or interesting phenomenon. Anomalies can occur due to various reasons, such as errors in data collection, equipment failures, fraudulent activities, cyberattacks, or rare events that are genuinely significant and require attention.

The process of anomaly detection typically involves data preprocessing, feature selection/extraction, algorithm and model selection, training and evaluation, and anomaly detection and interpretation. Data preprocessing involves cleaning and transforming the data, handling missing values, normalizing or standardizing the features, and preparing the dataset for further analysis. Feature selection/extraction involves selecting or extracting relevant features from the data that are expected to capture the patterns or characteristics of interest. This step can be important for improving the effectiveness of anomaly detection algorithms.

Various anomaly detection algorithms can be applied to the preprocessed dataset. The choice of algorithm depends on the nature of the data, the expected types of anomalies, and the available labeled or unlabeled data. Statistical-based methods assume that anomalies are statistical outliers and rely on measures such as mean, standard deviation, or probability distributions to detect deviations. Machine learning-based methods use unsupervised, semi-supervised, and supervised learning techniques to train models that can classify normal and anomalous data. Unsupervised techniques like clustering, density-based approaches, or one-class classification algorithms detect anomalies in an unlabeled test set of data based solely on the intrinsic properties of that data. Semi-supervised techniques use a normal, labeled training data set to construct a model representing normal behavior. They then use that model to detect anomalies by testing how likely the model is to generate any one instance encountered. Supervised techniques require a training data set with a set of normal and abnormal labels for a classification algorithm to learn patterns and features within the training data set. This kind of technique involves training the classifier using the labeled training data set and then testing the classifier on a separate unlabeled test or validation set of data. Time-series-based methods are specifically designed for detecting anomalies in sequential or time-series data, where the order and temporal dependencies of data points are important. Ensemble methods combine multiple anomaly detection algorithms or models to improve detection accuracy and robustness.

Training methods used for the algorithms depends on the presence or absence of labels. If labeled data with known anomalies is used, the selected model is trained using a training set and evaluated on a separate validation or test set. If unlabeled data with normal and abnormal data points is used, the selected model is trained using a training set. The algorithm's learning goal is to identify patterns within the unlabeled data and categorize the data points based on the same identified patterns. The selected model is then evaluated on a separate validation or test set. Evaluation metrics such as precision, recall, F1 score, or area under the curve (AUC) are used to assess the performance of the anomaly detection algorithm. Once the model is trained and validated, it is applied to new, unseen data to identify anomalies. Detected anomalies are then analyzed and interpreted to understand their significance and potential causes. Anomaly detection techniques can be applied in various domains, including cybersecurity, fraud detection, manufacturing, finance, network monitoring, and healthcare, among others. The choice of technique and the effectiveness of anomaly detection depend on the specific context, dataset characteristics, and the expertise of the data analyst or scientist.

SUMMARY

Techniques disclosed herein relate generally to anomaly detection. More specifically and without limitation, techniques for understanding the visual structure and patterns of documents and detecting anomalies in data of the documents based on the understanding of the visual structure and patterns of the documents. The techniques described herein detect the anomalies by extracting and comparing only visual features in the documents. Various embodiments are described herein to illustrate various features. These embodiments include various methods, systems, non-transitory computer-readable storage media storing programs, code, or instructions executable by one or more processors, and the like.

In various embodiments, a computer-implemented method is provided that includes: accessing a set of documents; converting the set of documents to a set of images in a binary format; generating a common feature template based on the set of images, wherein the generating comprises: generating a pixel map based on the set of images; and filtering low intensity pixels out of the pixel map to generate the common feature template; comparing each image from the set of images to the common feature template to identify images with at least one anomalous feature, wherein the comparing comprises: determining whether a difference in intensity exists between each pixel in each image and a same pixel in the common feature template; counting each pixel in each image that are different in intensity from the common feature template; determining whether the count of pixels that are different in intensity for each feature in each image is greater than a predetermined pixel count threshold; and when the count of pixels that are different in intensity for a feature in an image is greater than the predetermined pixel count threshold, identifying the feature as being an anomalous feature; and outputting the images with at least one anomalous feature.

In some embodiments, the generating the pixel map comprises: superimposing images from the set of images over one another, and mapping pixel intensities to a reference intensity function to create an additive affect for similar intensities and negative affect for different intensities.

In some embodiments, the filtering the low intensity pixels out of the pixel map, comprises: comparing an intensity of each pixel to a predetermined filter threshold and any pixel with an intensity below the predetermined filter threshold is removed from the pixel intensity map to obtain the common feature template.

In some embodiments, determining whether a difference in intensity exists between each pixel in each image and a same pixel in the common feature template, comprises: comparing an intensity value of each pixel in each image to the same pixel in the common feature template, and determining a difference in intensity exists between pixels when there is any difference in intensity value between the pixels.

In some embodiments, determining whether a difference in intensity exists between each pixel in each image and a same pixel in the common feature template, comprises: comparing an intensity value of each pixel in each image to the same pixel in the common feature template, determining any difference in intensity value between the pixels, comparing any difference in intensity value between the pixels to a predetermined intensity threshold, and determining a difference in intensity exists between the pixels when the difference in intensity value is greater than the predetermined intensity threshold.

In some embodiments, the comparing further comprises determining whether the anomalous feature is a common difference amongst the set of images, and when the anomalous feature is the common difference amongst the set of images, removing the anomalous feature from the set of images.

In some embodiments, the determining whether the anomalous feature is the common difference comprises comparing a number of images having the anomalous feature to a predetermined common feature threshold, and when the number of images having the anomalous feature is greater than the predetermined common feature threshold, determining the anomalous feature is the common difference amongst the set of images.

In various embodiments, a system is provided that includes one or more processors and one or more computer-readable media storing instructions which, when executed by the one or more processors, cause the system to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2I illustrate a workflow for anomaly detection in accordance with various embodiments.

DETAILED DESCRIPTION

Figure 1:
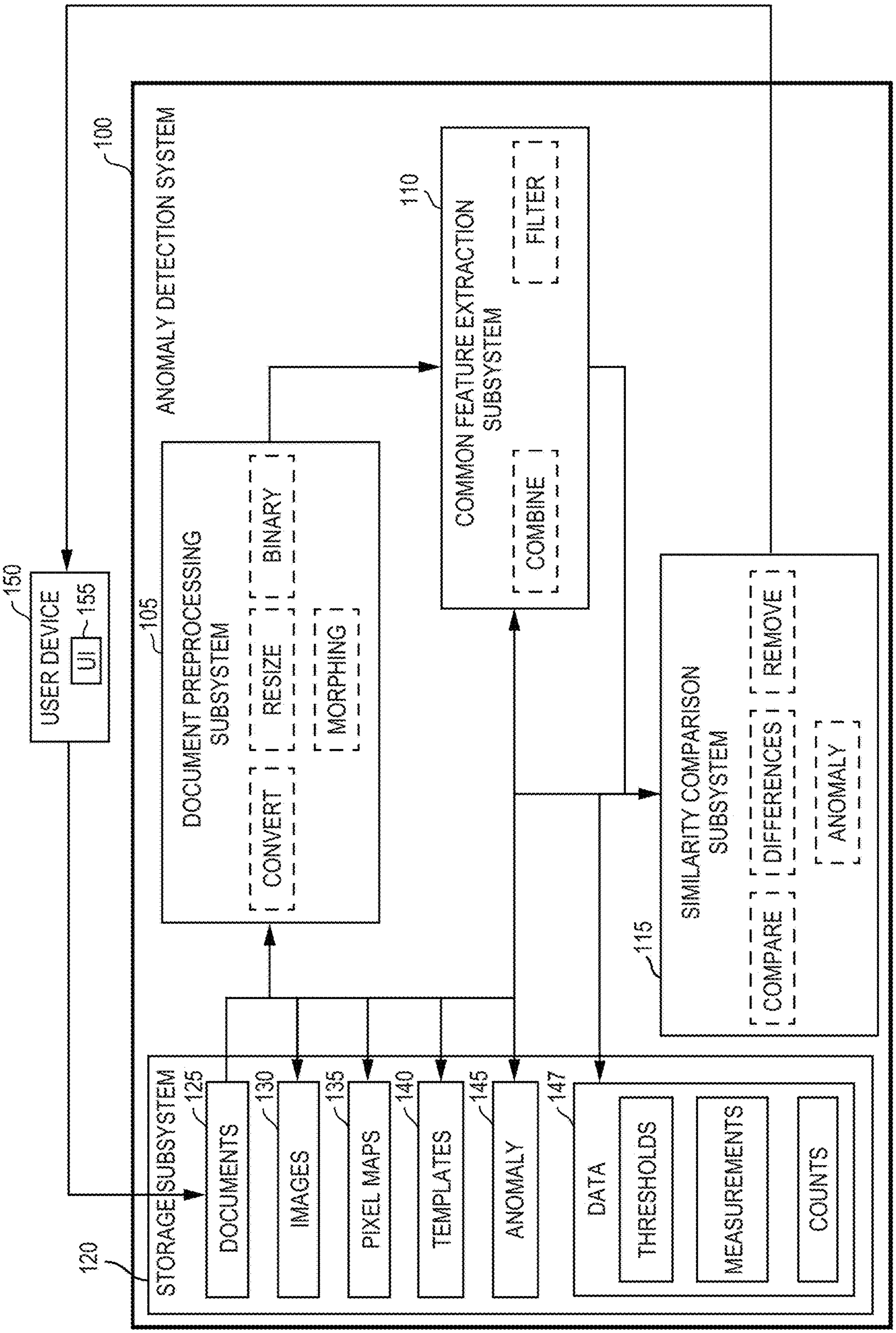
FIG. 1 is a block diagram of an anomaly detection system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Anomaly detection (also known as outlier analysis) identifies data points, events, and/or observations that deviate from a dataset's normal behavior. Anomalous data can indicate critical incidents, such as a technical glitch, defects, outliers, errors, or frauds, or potential opportunities, for instance, a change in consumer behavior. Many businesses or enterprises utilize anomaly detection services that provide a rich set of tools to identify events or observations in business data in real time so that businesses or enterprises can act based on the events or observations. Take for instance a financial enterprise, for loan approval, a customer submits personal identification documents that include unique identity information (e.g., Aadhaar or Social Security numbers, permanent account numbers (PAN), Legal Entity Identifier (LEI), Federal Employer Identification Number (EIN or FEIN)) and financial documents such as bank statements, income tax return (ITR) forms, pay slips, mortgage payments, utility payments, etc. Thereafter, a financial enterprise employee has to review and verify the accuracy of all the documents including performing a time series analysis to identify any changes in the data over a given time period (e.g., any change in pay slips over the past 3 to 6 months). Changes or differences in a set of documents may happen because of genuine or malicious reasons but the financial enterprise employee needs to know of the changes or differences irrespective of the reasons in order for the financial enterprise to make an informed decision on the loan approval.

Various methods and algorithms can be applied to a data set (e.g., documents) for anomaly detection. The majority of methods for anomaly detection in text-based documents extract data using optical character recognition (OCR) and then apply natural language processing (NLP) to understand and analyze the textual information for outliers. Various machine learning anomaly detection algorithms have been used to enhance the speed of detecting these outliers. For example, Deep Learning/CNN-based approaches such as Mask R-CNN, and Faster R-CNN have been used to helps identify defects in images but these approaches require a large amount of training data for the algorithms to learn anomaly patterns. Alternatively, classical clustering algorithms have been used to identify the pixel value of the images and apply approaches such as isolation forest and histogram-based approaches for anomaly detection based on the pixel values. These approaches typically work best if the image is colourful (i.e., clear patterns in the pixel values); however many documents such as financial documents are black and white images, and thus these approaches typically fail to detect anomalies in such documents.

In order to overcome these challenges and others, the present disclosure describes a framework to understand the visual structure and patterns of documents and detect anomalies in data of the documents based on the understanding of the visual structure and patterns of the documents. The techniques described herein detect the anomalies by extracting and comparing only visual features in the documents. The framework takes a set of documents as input and outputs the anomalous documents. First, the input documents are passed through a document preprocessing module which gives the document binary images. Then these document binary images are passed to a common feature extractor to identify and extract the common visual features to form a feature template. Here the features extracted are from the document image such as color, font size, font shape, document layout, and document background. Next, the feature template and the document binary images are passed to a Similarity comparison module to identify the anomalous documents.

In some embodiments, a computer implement method is provided that comprises: accessing a set of documents; converting the set of documents to a set of images in a binary format; generating a common feature template based on the set of images, where the generating comprises: generating a pixel map based on the set of images; and filtering low intensity pixels out of the pixel map to generate the common feature template; comparing each image from the set of images to the common feature template to identify images with at least one anomalous feature, where the comparing comprises: determining whether a difference in intensity exists between each pixel in each image and a same pixel in the common feature template; counting each pixel in each image that are different in intensity from the common feature template; determining whether the count of pixels that are different in intensity for each feature in each image is greater than a predetermined pixel count threshold; and when the count of pixels that are different in intensity for a feature in an image is greater than the predetermined pixel count threshold, identifying the feature as being an anomalous feature; and outputting the images with at least one anomalous feature.

Advantageously, anomalies are detected using only visual features of document images, which reduces processing complexity (e.g., there is no OCR or NLP processing of the document). Further, since a feature template is used for similarity comparison, the time complexity reduces from $O(n^2)$ to $O(n)$. For example: for comparing 10 images, it would conventionally take $^{10}C_2$ (45) comparisons, whereas using the present approaches it would only take 10 comparisons. Further, this framework is easily scalable because the present approaches have linear complexity and are agnostic to the type of data presented in the documents. Moreover, the framework does not need any training like the machine learning models. There is no need of learning any parameters (weights) of machine learning models beforehand, and thus the framework can solve cold start problems in finding anomalies in documents.

Anomaly Detection System

FIG. 1 is a block diagram of an anomaly detection system 100 according to various embodiments. The anomaly detection system 100 may be implemented using one or more computer systems, each computer system having one or more processors. The anomaly detection system 100 may include multiple components and subsystems communicatively coupled to each other via one or more communication mechanisms.

For example, in the embodiment depicted in FIG. 1, the anomaly detection system 100 includes a document preprocessing subsystem 105, a common feature extractor subsystem 110, and a similarity comparison subsystem 115. These subsystems may be implemented as one or more computer systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The anomaly detection system 100 depicted in FIG. 1 is merely an example and is not intended to unduly limit the scope of embodiments. Many variations, alternatives, and modifications are possible. For example, in some implementations, the anomaly detection system 100 may have more or fewer subsystems or components than those shown in FIG. 1, may combine two or more subsystems, or may have a different configuration or arrangement of subsystems. The anomaly detection system 100 and subsystems depicted in FIG. 1 may be implemented using one or more computer systems, such as the computer system depicted in FIG. 6.

As shown in FIG. 1, the anomaly detection system 100 includes a storage subsystem 120 that may store the various data constructs and programs used by the anomaly detection system 100. For example, the storage subsystem 120 may store various data such as sets of documents 125, sets of images, 130, pixel maps 135, feature templates 140, and anomalous images 145. However, this is not intended to be limiting. In alternative implementations, the sets of documents 125, sets of images, 130, pixel maps 135, common feature templates 140, and/or anomalous images 145 may be stored in other memory storage locations (e.g., different databases) that are accessible to the anomaly detection system 100, where such memory storage locations can be local to or remote from the record anomaly detection system 100. In addition, other data 147 used by the anomaly detection system 100 or generated by the anomaly detection system 100 as a part of its functioning may be stored in the storage subsystem 120. For example, predetermined thresholds, difference measurements (e.g., intensity values), and pixel counts used by or determined by the anomaly detection system 100 may be stored in the storage subsystem 120.

The set of documents 125 can be received or obtained from a system, computing device, or user 150 (e.g., obtained from a user interface 155). The set of documents 125 can be in a single format (e.g., .pdf) or multiple formats (e.g., .pdf and .docx). In some embodiments, the sets of documents 125 may correspond to different users or customers, and may include user information, e.g., a payment information or tax records. In certain implementations, each user may provide a set of documents 125 associated with the user. In other implementations, each user may provide a set of documents 125 associated with their organization, business, or another user/customer. In certain instances, particularly those pertaining to the financial domain, the set of documents 125 are electronically generated documents such as salary slips, receipts, invoices etc.

In some implementations, the anomaly detection system 100 performs multiple-step processing including conversion of documents to images, image resizing, image binarization, and image morphing that are performed by the document preprocessing subsystem 105; image superimposition/addition and pixel filtering that are performed by the common feature extractor subsystem 110; and similarity comparison, removal of common differences, and anomaly detection that are performed by the similarity comparison subsystem 115. Each of the processing steps and the functions performed by the corresponding subsystems are described herein in more detail (see the description of FIGS. 2A-2I).

The document preprocessing subsystem 105 is configured to obtain sets of documents 125, convert the sets of documents 125 from a document type of format to an image format to generate the sets of images 130. The document preprocessing subsystem 105 is optionally further configured to resize/scale down the sets of images 130 for faster downstream processing. The document preprocessing subsystem 105 is further configured to convert the sets of images 130 to binary format. The document preprocessing subsystem 105 is optionally further configured to make the text bolder in the sets of images 130.

The common feature extractor subsystem 110 is configured to capture the common features such as text size, text shape, and layout and create feature templates 140. Initially, the common feature extractor subsystem 110 is configured to combine the sets of images 130 to create a pixel map 135. Thereafter, the common feature extractor subsystem 110 is configured to filter out the low intensity pixels to obtain a feature template 140.

The similarity comparison subsystem 115 is configured to compare all the binary images against the feature template 140 to determine the differences between the binary images and the feature template 140. If there are differences in a region in most images, then it is not considered an anomaly, e.g., changes in date, month, year. Such common differences may be identified and removed. A threshold is set and similarity comparison subsystem 115 is further configured to determine if a pixel count is above the threshold in the difference image, and when the pixel count is above the threshold, the binary image may be identified as an anomalous image 145. The identification of the anomalous image(s) 145 may be output to a system, computing device, or user 150 (e.g., communicated via the user interface 155).

Anomaly Detection Workflow

Figure 2A:
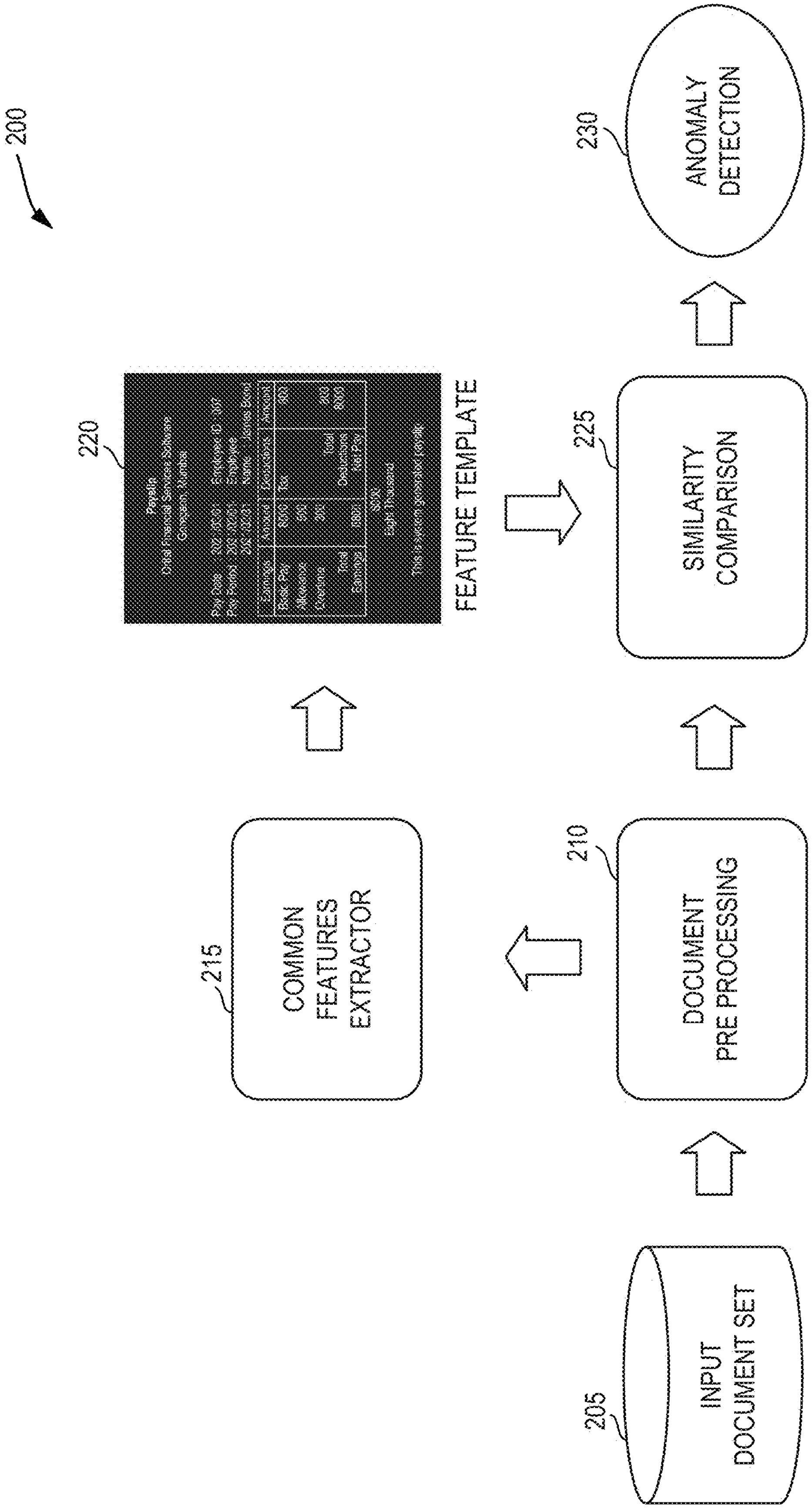

FIG. 2A is a simplified block diagram of an anomaly detection workflow 200 that takes a set of documents as input and outputs the anomalous documents based on visual cues according to various embodiments. Anomaly detection workflow 200 starts with an input set of documents 205 such as a set of pay slips or invoices from a user (see, e.g., the four different pay slips in FIG. 2B). The input set of documents 205 are pre-processed 210 to generate a set of pre-processed documents (described herein as images of the documents), common features (e.g., position of text, fonts, font shape, layout of document, etc. that is common across all documents/images) are extracted 215 from the images, and a feature template 220 is formed from the images based on the extracted features. The feature template 220 has the common features across the input set of documents 205. Next, all the images are paired with the feature template, and similarity is compared 225. Anomalous regions in each of the images are identified and highlighted 230 based on the comparison. Anything in an image not found common across all images (i.e., the feature template) is identified as an anomaly.

Figure 2C:
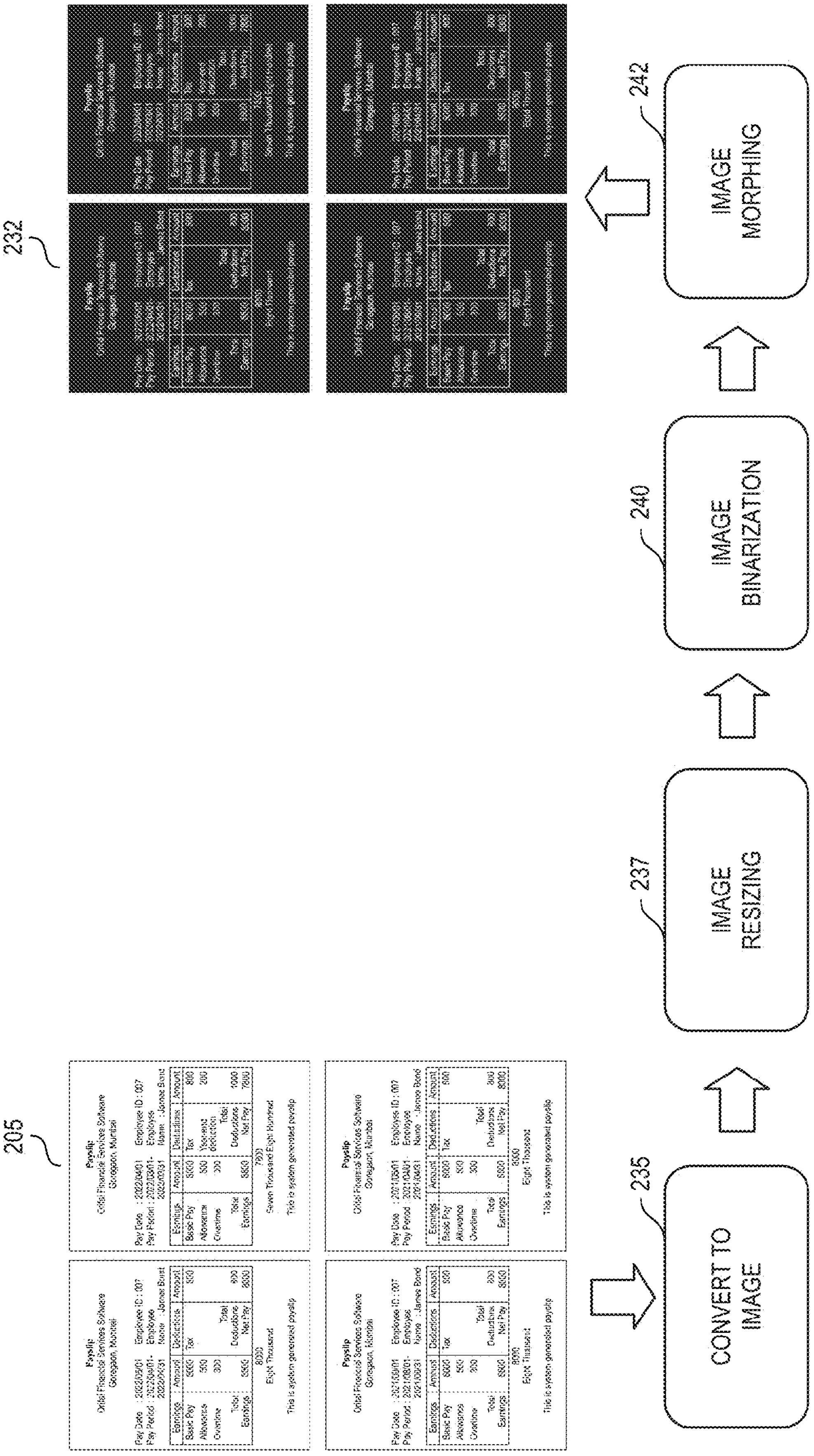

As shown in FIG. 2C, the input set of documents 205 are pre-processed 210 to generate a set of images 232. The pre-processing 210 includes converting 235 the input set of documents 205 from initial formats of documents (e.g., file formats used for digital text such as pdf, .xlsx, or docx) to image formats (e.g., file formats for a digital image such a jpg, png, or jpeg). There are opensource libraries or tools available in the market, which will be used to convert the various document types to image format. Next, the images 232 may be resized/scaled 237 down for faster downstream processing. This step is optional and may only be performed if the image sizes are greater than a predetermined threshold such as 1000×1000 px. The images 232 are then converted 240 to a binary format. Binary images are images whose pixels have only two possible intensity values (see, e.g., the images 232 in FIG. 2D). Numerically, the two values may be 0 for black, and either 1 or 255 for white. (e.g., background=0 foreground=1). In general, any image has three channels, RGB, for each pixel, which contains intensity of Red, Green and Blue colors. This intensity ranges from 0-255 for each channel. To convert into binary format, the values of each pixel are averaged across the three channels to obtain a single channel whose values range from 0-255. This is called as a greyscale image or in simpler terms a black and white image. Now on this greyscale image, a threshold value is set and thresholding is applied to obtain the binary image. For example, if the threshold is 125, all the pixels in the greyscale image whose values are less than 125 are considered as 0 or background pixels, and pixels whose values are greater than 125 are considered as 1 or foreground pixels. Therefore, all the pixels in the image will be either 1 or 0, hence the name binary image.

Next, an image morphing or digital image processing operation 242 may be performed to make the text bolder. This step is also optional.

Figure 2E:
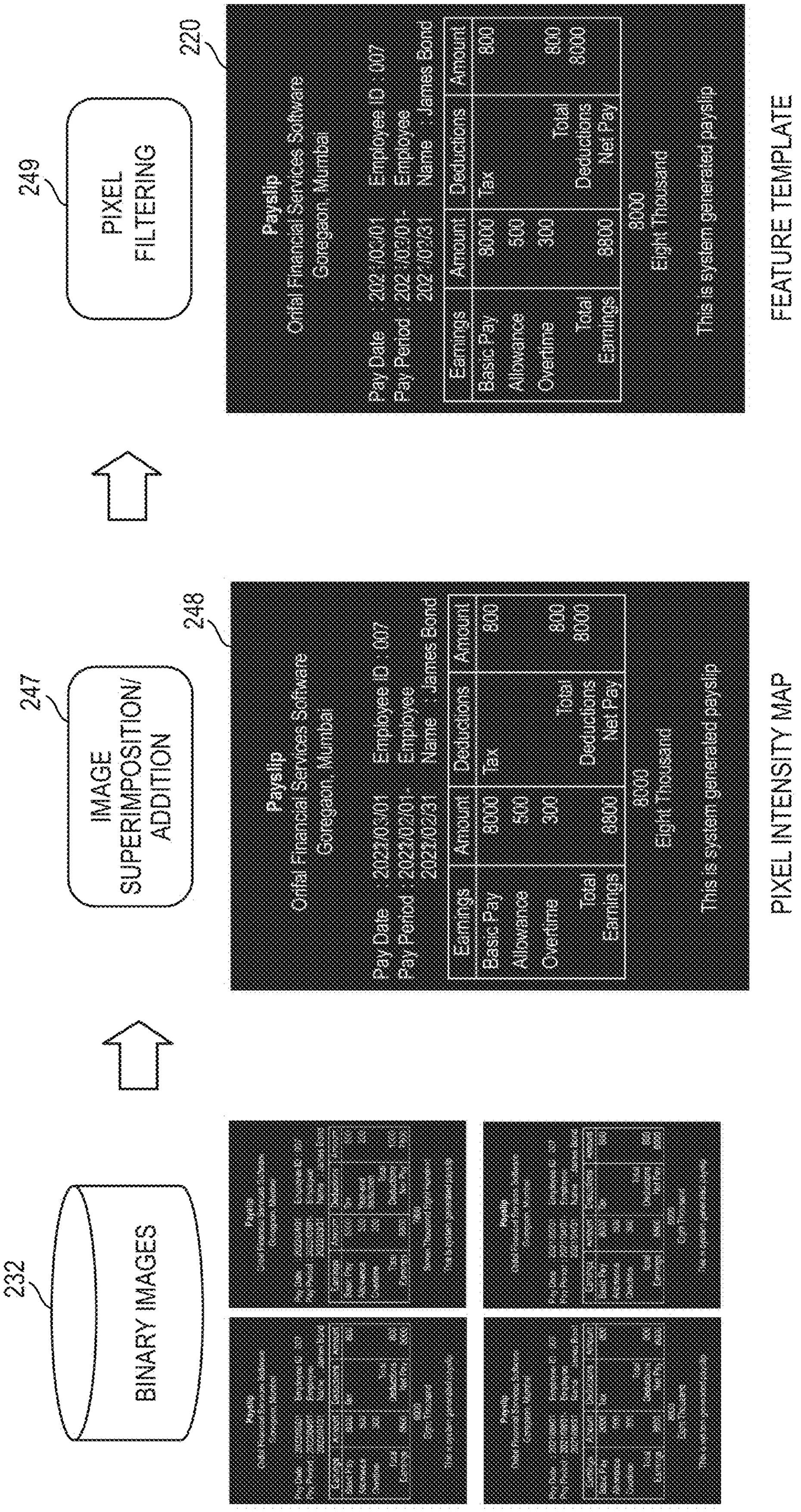

As shown in FIG. 2E, common features are extracted 215 from the set of images 232. First, a mapping algorithm 247 is applied to the images 232 to create a pixel intensity map 248 (see, e.g., pixel intensity map 248 in FIG. 2F). More specifically, each image 232 is divided into multiple equally sized units called pixels. Each pixel in an image represents a discrete area in a document and has an associated intensity value, so that in grayscale lower intensities appear very dark (black) and higher intensities appear very light (white). The mapping algorithm 247 estimates the common features of the image by superimposing the images over one another, and mapping pixel intensities to a reference intensity function to create an additive affect for similar intensities and negative affect for different intensities. The intensity value of a pixel is measured by the sum of the RGB values normalized to 1 or any other means for measuring the intensity value of a pixel such as relative luminescence. Consequently, the common features (e.g., position of text, fonts, font shape, layout of document, etc. that is common across all documents/images) have high intensity and anomalous features have low intensity within the pixel intensity map 248.

Figure 2F:
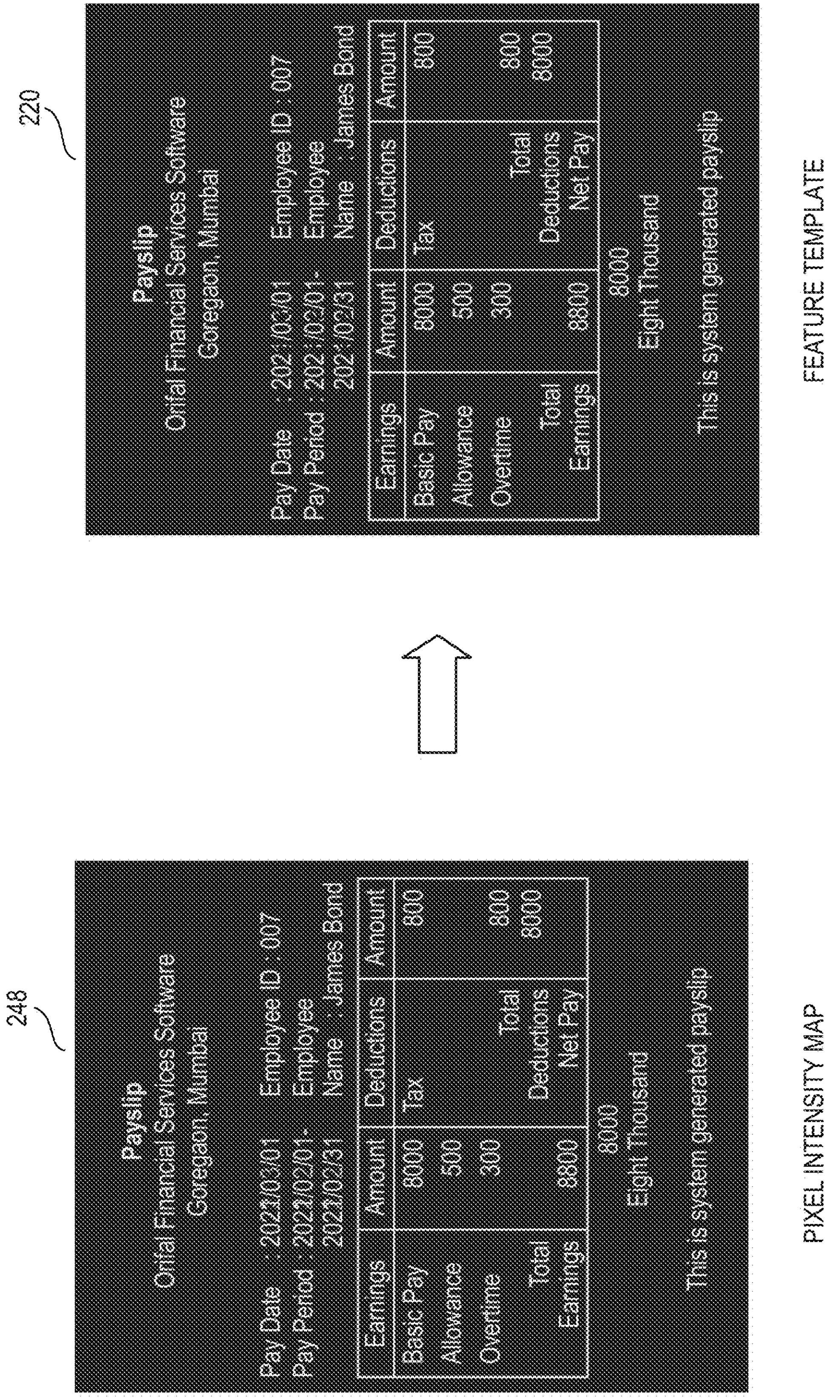

Thereafter, the low intensity pixels are filtered 249 out of the pixel intensity map 248 to obtain a common feature template 220 (see, e.g., common feature template 220 in FIG. 2F). The filtering may compare the intensity of each pixel or region to a predetermined filter threshold and any pixel or region with an intensity below the predetermined filter threshold is removed from the pixel intensity map 248 to obtain a common feature template 220. In some instances, the predetermined filter threshold is determined based on a number of documents within the set of documents 205. For example, if 100 documents are within the set of documents 205, the predetermined filter threshold may be set at 20% intensity; whereas if 10 documents are within the set of documents 205, the predetermined filter threshold may be set at 50% intensity. Removing/filtering may be performed by changing the characteristics of the pixel or region to the same characteristics as pixels or regions in the background. The common feature template 220 may then be stored and retrieved by downstream processes for detecting anomalies within the input set of documents 205 and/or future sets of documents pertaining to a same user, organization, subject matter, or the like.

Figure 2G:
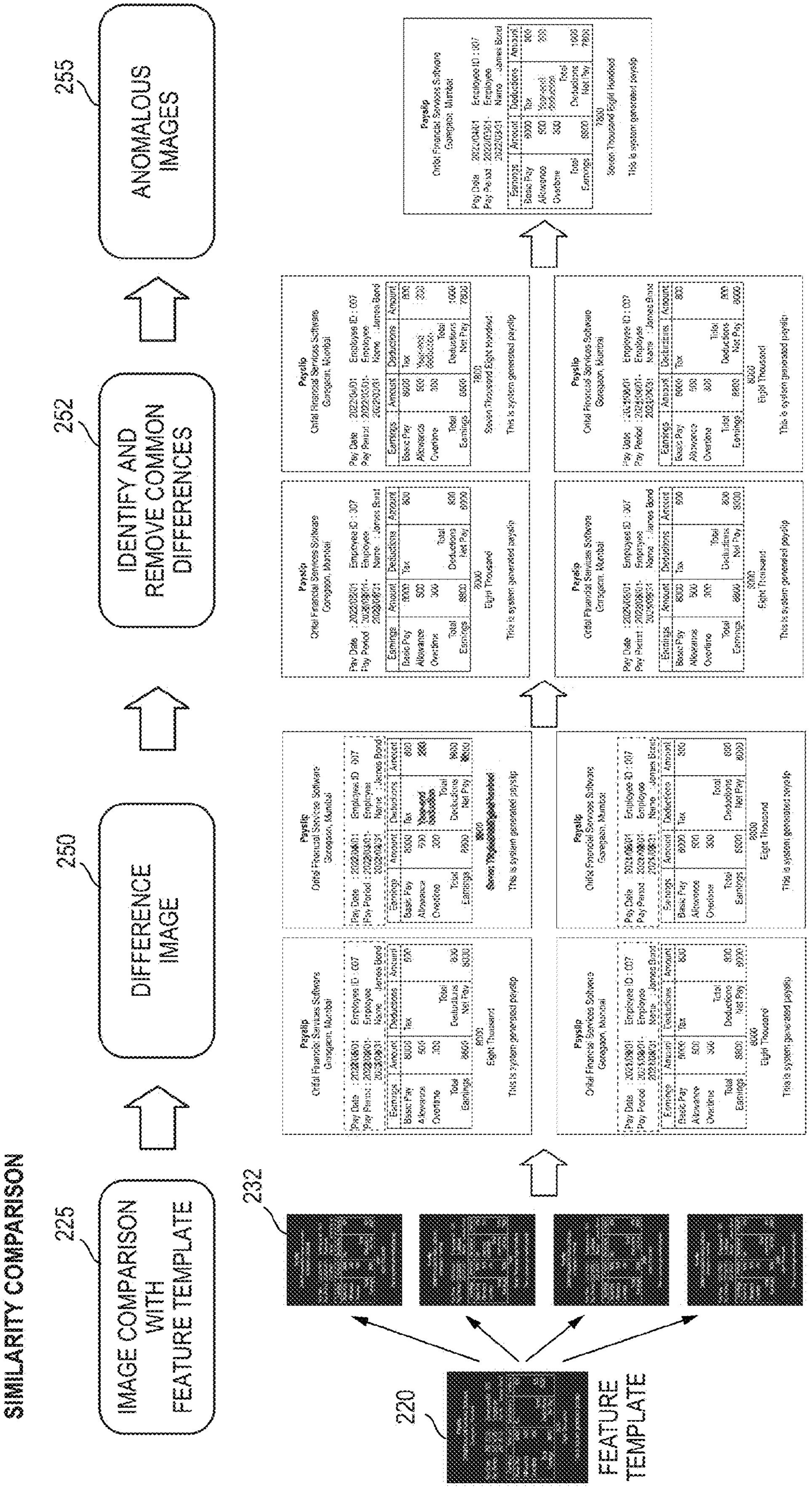
Figure 2H:
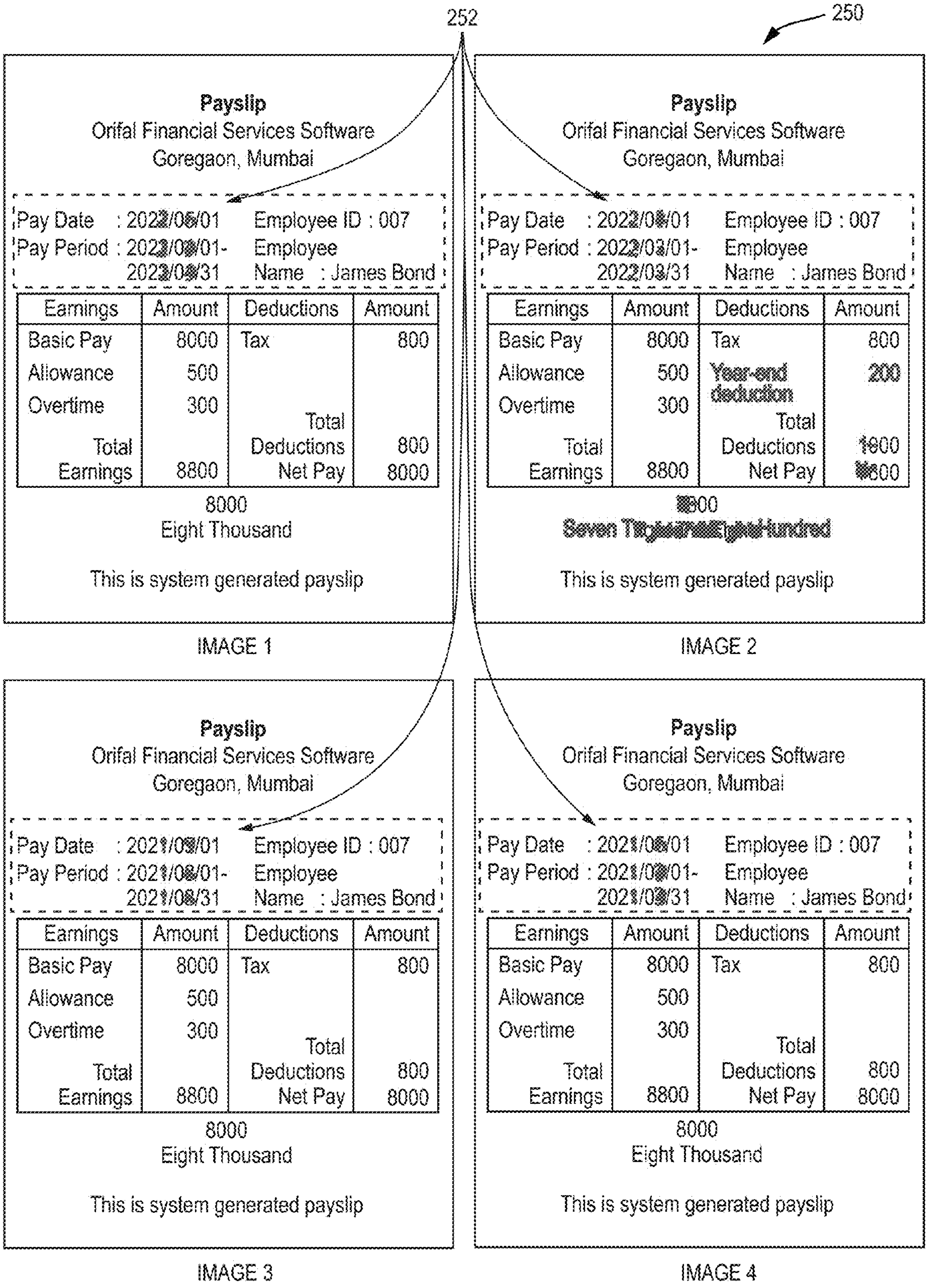

As shown in FIG. 2G, each image from the set of images 232 is paired with the feature template 220, and a similarity is compared 225. This comparison obtains the differences 250 in features between each image and the feature template 220 (see, e.g., the differences 250 illustrated in red/bold in FIG. 2H). In some embodiments, the difference being analyzed in the comparison is a difference in intensity value between each pixel in the image and the same pixel in the feature template 220. The intensity value of a pixel is measured by the sum of the RGB values normalized to 1 or any other means for measuring the intensity value of a pixel such as relative luminescence. A difference in intensity values of each pixel in the image and the same pixel in the feature template 220 may be determined as an absolute (i.e., any difference in intensity value no matter how small) or based on a difference in intensity value that is greater than a predetermined intensity threshold such as a difference of greater than 10%. Each pixel in the image that is determined to be different from the same pixel in the feature template 220 is classified as being different and counted.

To identify whether a difference in a feature (e.g., position of text, fonts, font shape, layout of document, etc.) exists between an image and the feature template 220, a determination is made as to whether a count of pixels classified as different for a given feature is greater than a predetermined pixel count threshold such as 50 px. When the count of pixels classified as different for a given feature is greater than the predetermined pixel count threshold, then that feature is identified as an anomaly. When the count of pixels classified as different for a given feature is not greater than the predetermined pixel count threshold, then that feature may not be common but is also not identified as an anomaly. Moreover, if there is a feature difference found in a same region in most of the images (e.g., greater than a predetermined common feature threshold such as 80% of the images), then that feature difference is considered a common difference 252 and not an anomaly, e.g., changes in date, month, year (see, e.g., common differences 252 illustrated in red/bold within the dashed boxes in FIG. 2H). In certain instances, these common differences 252 are removed/filtered from each image. More specifically, when an intersection or common region of the difference image set 250 is determined, it will identify the common differences regions. Now that the pixels corresponding to common differences regions are identified they are removed or not marked as red/bold in the difference image set 250. The images that have at least one feature classified as an anomaly and/or a total count of pixels classified as different for the entire image being greater than a predetermined total pixel count threshold are considered to be anomalous images 255 (see, e.g., anomalous image 255 in FIG. 2I having a higher count of difference pixels than the predetermined total pixel count threshold).

The anomaly detection workflow 200 has many practical applications including detection of anomalies, additional information, missing information, or a combination thereof in various types of documents including financial documents such as pay slips, invoices, receipts, and the like. The anomalies, additional information, missing information, or a combination thereof can then be used in downstream processing, e.g., processing of a loan application or tax return, fraud detection, assessing completion of a form document, and the like.

Techniques for Anomaly Detection

Figure 3:
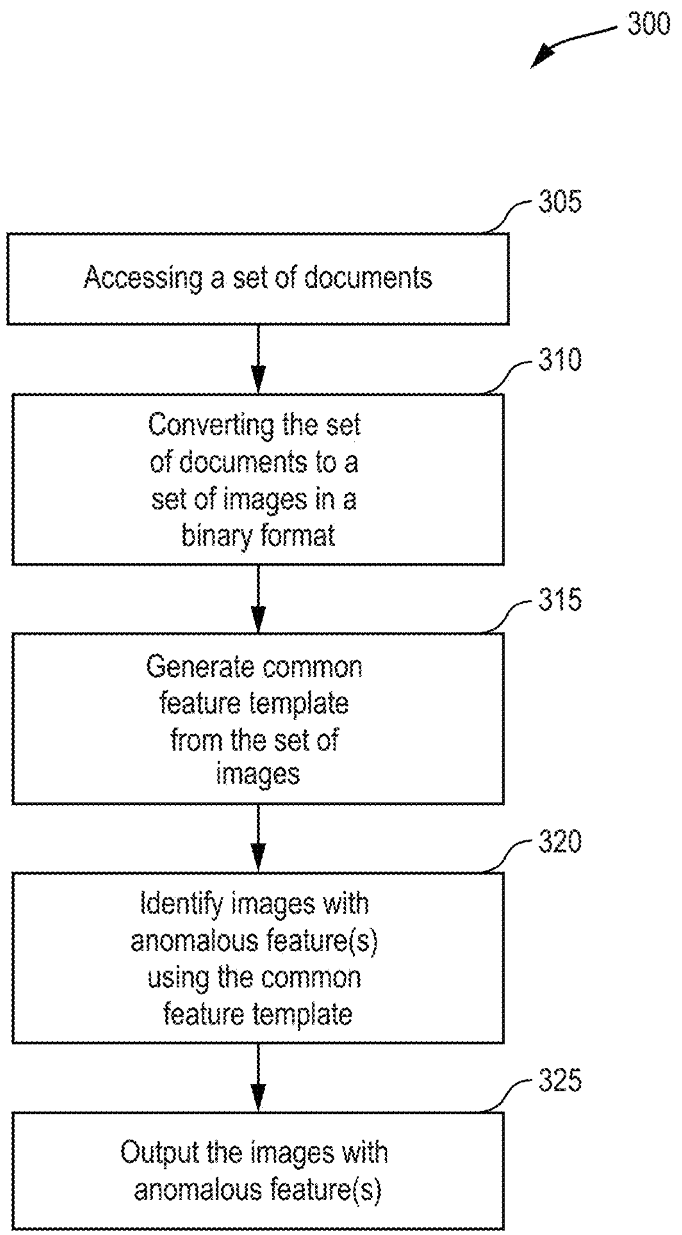
FIG. 3 is a process flow for anomaly detection in accordance with various embodiments.

FIG. 3 is a flowchart illustrating a process 300 for detecting anomalies in documents in accordance with various embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in a different order, or some steps may also be performed in parallel. In certain embodiments, such as in the embodiments depicted in FIGS. 1-2I, the processing depicted in FIG. 3 may be performed by an anomaly detection system (e.g., anomaly detection system 100) to detect anomalies in documents.

At step 305, a set of documents is accessed.

At step 310, the set of documents is converted to a set of images in a binary format.

At step 315, a common feature template is generated based on the set of images. The common feature template is generated by: generating a pixel map based on the set of images; and filtering low intensity pixels out of the pixel map to generate the common feature template. In some instances, generating the pixel map comprises: superimposing images from the set of images over one another, and mapping pixel intensities to a reference intensity function to create an additive affect for similar intensities and negative affect for different intensities. In some instances, the filtering the low intensity pixels out of the pixel map, comprises: comparing an intensity of each pixel to a predetermined filter threshold and any pixel with an intensity below the predetermined filter threshold is removed from the pixel intensity map to obtain the common feature template.

At step 320, each image from the set of images is compared to the common feature template to identify images with at least one anomalous feature. The comparing comprises: determining whether a difference in intensity exists between each pixel in each image and a same pixel in the common feature template; counting each pixel in each image that are different in intensity from the common feature template; determining whether the count of pixels that are different in intensity for each feature in each image is greater than a predetermined pixel count threshold; and when the count of pixels that are different in intensity for a feature in an image is greater than the predetermined pixel count threshold, identifying the feature as being an anomalous feature.

In some instances, determining whether a difference in intensity exists between each pixel in each image and a same pixel in the common feature template, comprises: comparing an intensity value of each pixel in each image to the same pixel in the common feature template, and determining a difference in intensity exists between pixels when there is any difference in intensity value between the pixels. In other instances, determining whether a difference in intensity exists between each pixel in each image and a same pixel in the common feature template, comprises: comparing an intensity value of each pixel in each image to the same pixel in the common feature template, determining any difference in intensity value between the pixels, comparing any difference in intensity value between the pixels to a predetermined intensity threshold, and determining a difference in intensity exists between the pixels when the difference in intensity value is greater than the predetermined intensity threshold.

In some instances, the comparing further comprises: determining whether the anomalous feature is a common difference amongst the set of images, and when the anomalous feature is the common difference amongst the set of images, removing the anomalous feature from the set of images. The determining whether the anomalous feature is the common difference comprises comparing a number of images having the anomalous feature to a predetermined common feature threshold, and when the number of images having the anomalous feature is greater than the predetermined common feature threshold, determining the anomalous feature is the common difference amongst the set of images.

At step 325, the images with at least one anomalous feature are output. For example, the images may be communicated to a storage device, a computing system, a user, a user interface, or the like. In certain instances, the images with at least one anomalous feature are output to a computing system for downstream processing that includes approving or rejecting a process (e.g., loan application) supported by the documents based on the images with at least one anomalous feature.

Illustrative Systems

Figure 4:
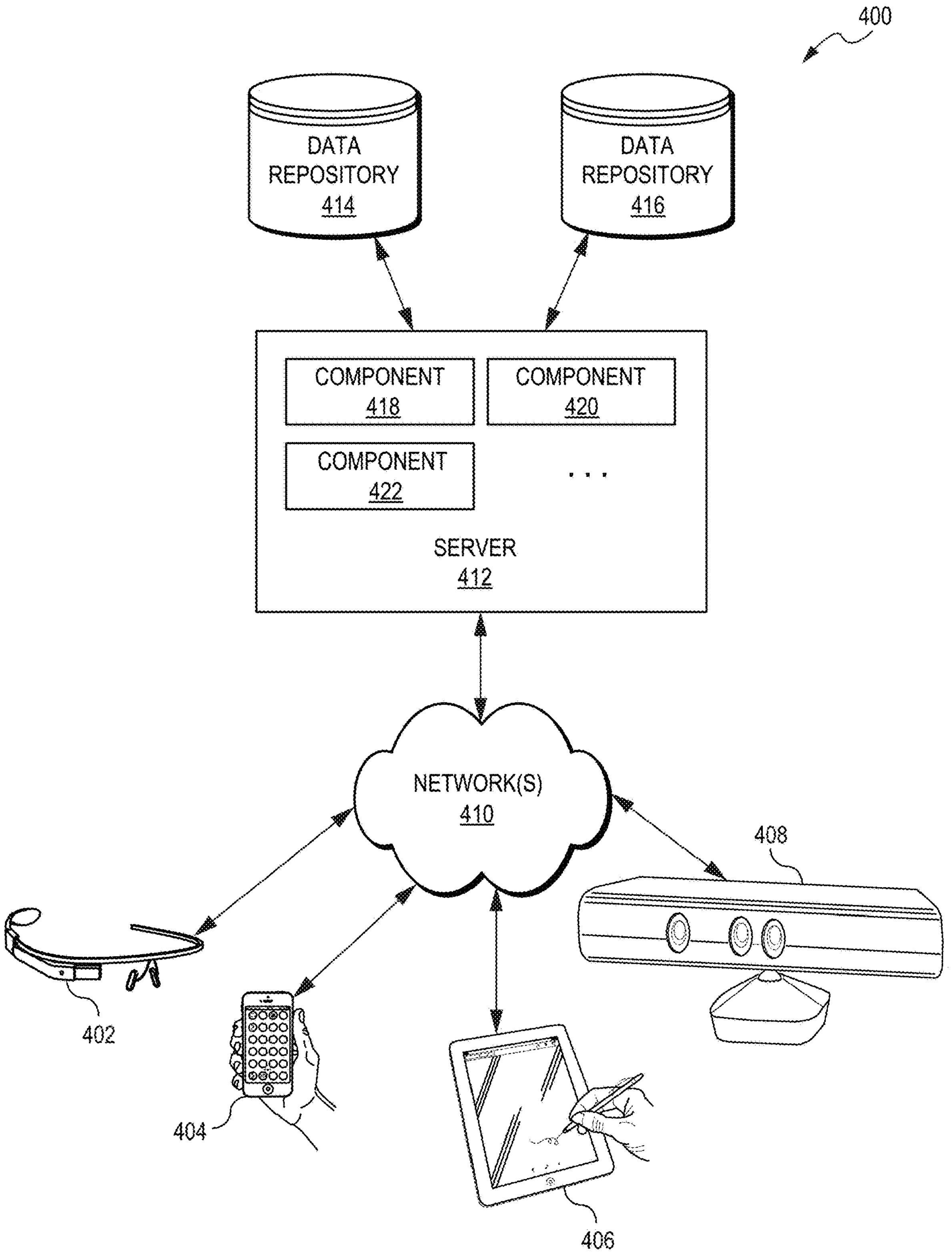
FIG. 4 depicts a simplified diagram of a distributed system for implementing various embodiments.

FIG. 4 depicts a simplified diagram of a distributed system 400. In the illustrated example, distributed system 400 includes one or more client computing devices 402, 404, 406, and 408, coupled to a server 412 via one or more communication networks 410. Client computing devices 402, 404, 406, and 408 may be configured to execute one or more applications. In certain implementations, the record topic prediction system 100 may reside at the server 412.

In various examples, server 412 may be adapted to run one or more services or software applications that enable one or more embodiments described in this disclosure. In certain examples, server 412 may also provide other services or software applications that may include non-virtual and virtual environments. In some examples, these services may be offered as web-based or cloud services, such as under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, server 412 may include one or more components 418, 420 and 422 that implement the functions performed by server 412. These components may include software components that may be executed by one or more processors, hardware components, or combinations thereof. It should be appreciated that various different system configurations are possible, which may be different from distributed system 400. The example shown in FIG. 4 is thus one example of a distributed system for implementing an example system and is not intended to be limiting.

Users may use client computing devices 402, 404, 406, and/or 408 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 4 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 410 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 410 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 may include one or more virtual machines running virtual operating systems, or other computing architectures involving virtualization such as one or more flexible pools of logical storage devices that may be virtualized to maintain virtual storage devices for the server. In various examples, server 412 may be adapted to run one or more services or software applications that provide the functionality described in the foregoing disclosure.

The computing systems in server 412 may run one or more operating systems including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more data repositories 414, 416. These data repositories may be used to store data and other information in certain examples. For example, one or more of the data repositories 414, 416 may be used to store information such as information related to machine-learning model performance or generated machine-learning model for use by server 412 when performing various functions in accordance with various embodiments. Data repositories 414, 416 may reside in a variety of locations. For example, a data repository used by server 412 may be local to server 412 or may be remote from server 412 and in communication with server 412 via a network-based or dedicated connection. Data repositories 414, 416 may be of different types. In certain examples, a data repository used by server 412 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 414, 416 may also be used by applications to store application data. The data repositories used by applications may be of different types such as, for example, a key-value store repository, an object store repository, or a general storage repository supported by a file system.

Figure 5:
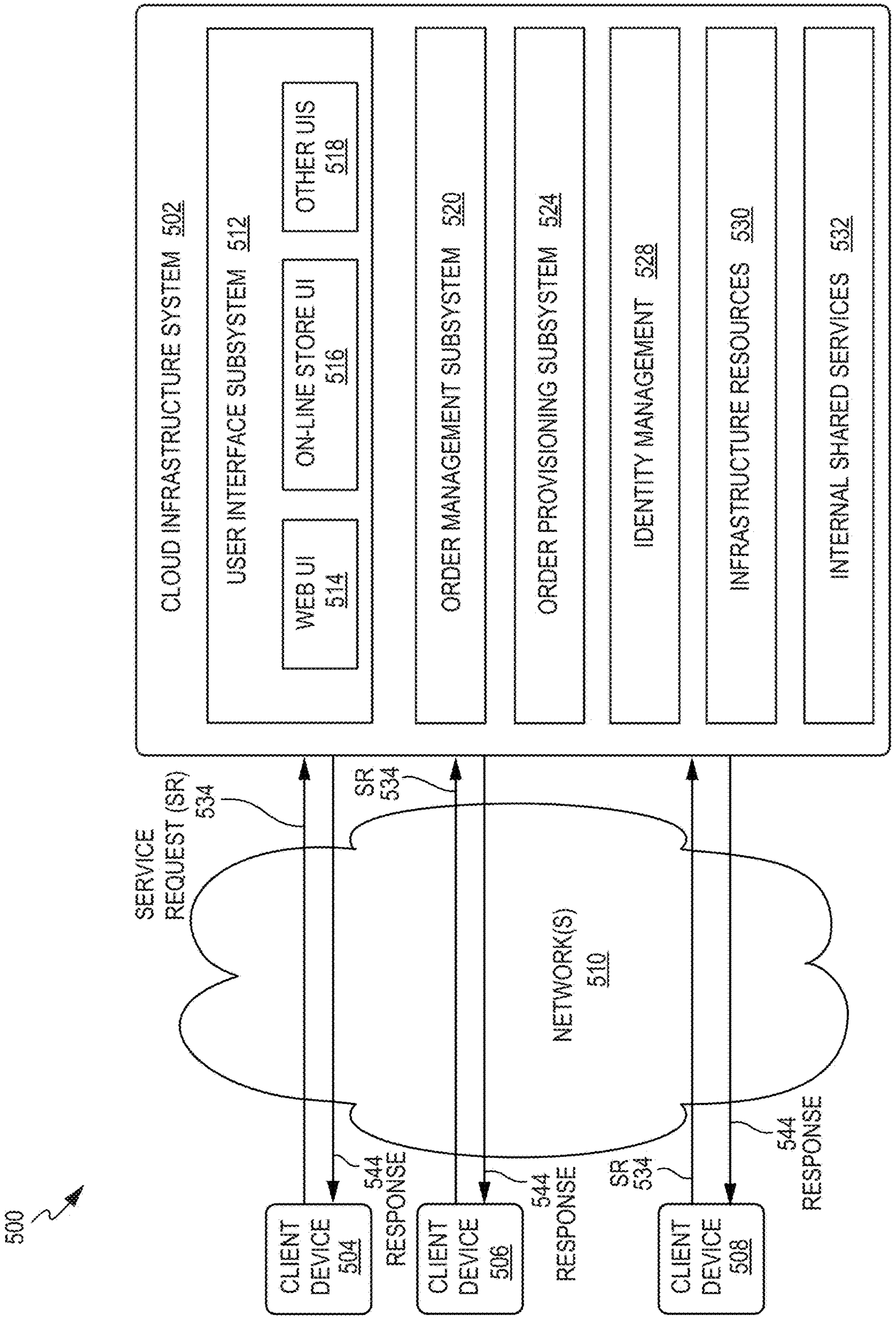
FIG. 5 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 5 is a simplified block diagram of a cloud-based system environment in which various services may be offered as cloud services in accordance with certain examples. In the example depicted in FIG. 5, cloud infrastructure system 502 may provide one or more cloud services that may be requested by users using one or more client computing devices 504, 506, and 508. Cloud infrastructure system 502 may include one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The example depicted in FIG. 5 is only one example of a cloud infrastructure system and is not intended to be limiting. It should be appreciated that, in some other examples, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative examples.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the customer's own on-premises servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 502. Cloud infrastructure system 502 then performs processing to provide the services requested in the customer's subscription order. For example, a user may use utterances to request the cloud infrastructure system to take a certain action (e.g., an intent), as described above, and/or provide services for a record topic prediction system as described herein. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public customer, where the customer may be an individual or an enterprise. In certain other examples, under a private cloud model, cloud infrastructure system 502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 502 and the services provided may be shared by several organizations in a related community. Various other models such as hybrids of the above mentioned models may also be used.

Client computing devices 504, 506, and 508 may be of different types (such as client computing devices 402, 404, 406, and 408 depicted in FIG. 4) and may be capable of operating one or more client applications. A user may use a client device to interact with cloud infrastructure system 502, such as to request a service provided by cloud infrastructure system 502. For example, a user may use a client device to request information or action from a record topic prediction system as described in this disclosure, or from another system.

In some examples, the processing performed by cloud infrastructure system 502 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 502 for generating and training one or more models for a machine-learning recommendation system. The data used for this analysis may include structured data (e.g., data stored in a database or structured according to a structured model) and/or unstructured data (e.g., data blobs (binary large objects)).

As depicted in the example in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like. In certain examples, the storage virtual machines that are available for servicing storage requested from applications may be part of cloud infrastructure system 502. In other examples, the storage virtual machines may be part of different systems.

In certain examples, to facilitate efficient provisioning of these resources for supporting the various cloud services provided by cloud infrastructure system 502 for different customers, the resources may be bundled into sets of resources or resource modules (also referred to as "pods"). Each resource module or pod may include a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may include multiple subsystems. These subsystems may be implemented in software, or hardware, or combinations thereof. As depicted in FIG. 5, the subsystems may include a user interface subsystem 512 that enables users or customers of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a customer may, using a client device, request (service request 534) one or more services provided by cloud infrastructure system 502 using one or more of interfaces 514, 516, and 518. For example, a customer may access the online store, browse cloud services offered by cloud infrastructure system 502, and place a subscription order for one or more services offered by cloud infrastructure system 502 that the customer wishes to subscribe to. The service request may include information identifying the customer and one or more services that the customer desires to subscribe to. For example, a customer may place a subscription order for a service offered by cloud infrastructure system 502. As part of the order, the customer may provide information identifying a machine-learning recommendation system for which the service is to be provided and optionally one or more credentials for the machine-learning recommendation system.

In certain examples, such as the example depicted in FIG. 5, cloud infrastructure system 502 may include an order management subsystem (OMS) 520 that is configured to process the new order. As part of this processing, OMS 520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 502 as part of the provisioning process. Cloud infrastructure system 502 may generate an application ID and select a storage virtual machine for an application from among storage virtual machines provided by cloud infrastructure system 502 itself or from storage virtual machines provided by other systems other than cloud infrastructure system 502.

Cloud infrastructure system 502 may send a response or notification 544 to the requesting customer to indicate when the requested service is now ready for use. In some instances, information (e.g., a link) may be sent to the customer that enables the customer to start using and availing the benefits of the requested services. In certain examples, for a customer requesting the service, the response may include a machine-learning recommendation system ID generated by cloud infrastructure system 502 and information identifying a machine-learning recommendation system selected by cloud infrastructure system 502 for the machine-learning recommendation system corresponding to the machine-learning recommendation system ID.

Cloud infrastructure system 502 may provide services to multiple customers. For each customer, cloud infrastructure system 502 is responsible for managing information related to one or more subscription orders received from the customer, maintaining customer data related to the orders, and providing the requested services to the customer. Cloud infrastructure system 502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 502 may provide services to multiple customers in parallel. Cloud infrastructure system 502 may store information for these customers, including possibly proprietary information. In certain examples, cloud infrastructure system 502 includes an identity management subsystem (IMS) 528 that is configured to manage customer information and provide the separation of the managed information such that information related to one customer is not accessible by another customer. IMS 528 may be configured to provide various security-related services such as identity services, such as information access management, authentication and authorization services, services for managing customer identities and roles and related capabilities, and the like.

Figure 6:
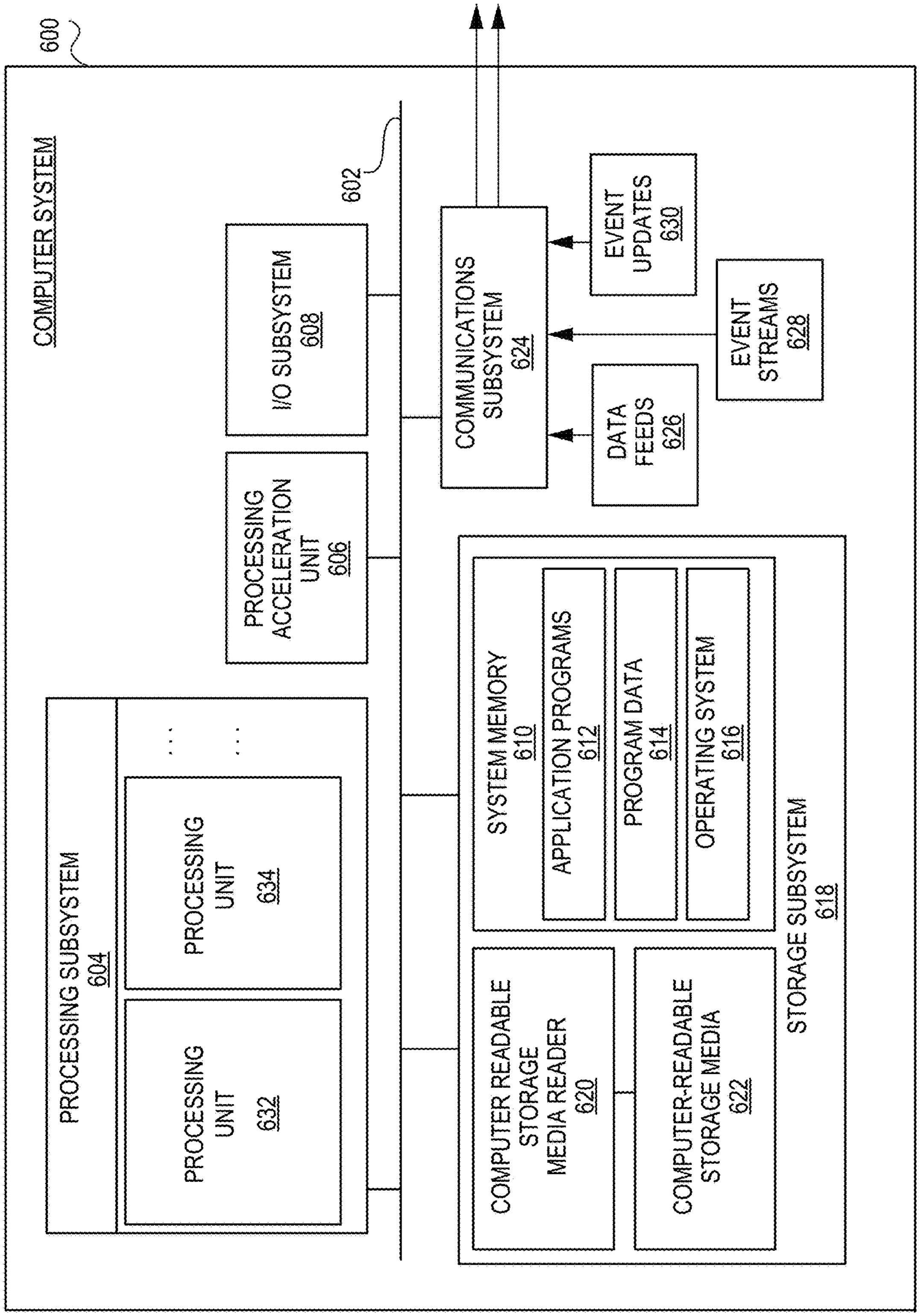
FIG. 6 illustrates an example computer system that may be used to implement various embodiments.

FIG. 6 illustrates an example of computer system 600. In some examples, computer system 600 may be used to implement the record topic prediction system within a distributed environment, and various servers and computer systems described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative examples of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 604 controls the operation of computer system 600 and may include one or more processors, application specific integrated circuits (ASICs), or field programmable gate arrays (FPGAs). The processors may include be single core or multicore processors. The processing resources of computer system 600 may be organized into one or more processing units 632, 634, etc. A processing unit may include one or more processors, one or more cores from the same or different processors, a combination of cores and processors, or other combinations of cores and processors. In some examples, processing subsystem 604 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 604 may execute instructions stored in system memory 610 or on computer-readable storage media 622. In various examples, the processing units may execute a variety of programs or code instructions and may maintain multiple concurrently executing programs or processes. At any given time, some or all of the program code to be executed may be resident in system memory 610 and/or on computer-readable storage media 622 including potentially on one or more storage devices. Through suitable programming, processing subsystem 604 may provide various functionalities described above. In instances where computer system 600 is executing one or more virtual machines, one or more processing units may be allocated to each virtual machine.

In certain examples, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some examples. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide authentication in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 622 may store programming and data constructs that provide the functionality of some examples. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 618 may also include a computer-readable storage media reader 620 that may further be connected to computer-readable storage media 622. Reader 620 may receive and be configured to read data from a memory device such as a disk, a flash drive, etc.

In certain examples, computer system 600 may support virtualization technologies, including but not limited to virtualization of processing and memory resources. For example, computer system 600 may provide support for executing one or more virtual machines. In certain examples, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. In certain examples, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.XX family standards, or other mobile communication technologies, or any combination thereof), global positioning system (GPS) receiver components, and/or other components. In some examples, communications subsystem 624 may provide wired network connectivity (e.g., Ethernet) in addition to or instead of a wireless interface.

Communication subsystem 624 may receive and transmit data in various forms. In some examples, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 624 may be configured to receive data in the form of continuous data streams, which may include event streams 628 of real-time events and/or event updates 630, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
- accessing a set of documents;
- converting the set of documents to a set of images in a binary format;
- generating a common feature template based on the set of images, wherein the generating comprises:
  - generating a pixel map based on the set of images, and
  - filtering low intensity pixels out of the pixel map to generate the common feature template;
- comparing each image from the set of images to the common feature template to identify images with at least one anomalous feature, wherein the comparing each image comprises:
  - determining whether a difference in intensity exists between each pixel in each image and a same pixel in the common feature template,
  - counting each pixel in each image that is different in intensity from the same pixel in the common feature template,
  - determining whether a count of pixels that are different in intensity for each feature among a plurality of features in each image is greater than a predetermined pixel count threshold,
  - when the count of pixels that are different in intensity for a given feature of the plurality of features in the image is greater than the predetermined pixel count threshold, determining whether the given feature is a common difference feature in at least a predetermined threshold number of the images,
  - in response to the determining that the given feature is the common difference feature in at least the predetermined threshold number of the images, filtering out the common difference feature from the images of the set of images, and
  - in response to the determining that the given feature is not the common difference feature in at least the predetermined threshold number of the images,
- identifying the given feature as an anomalous feature; and
- outputting the images with the at least one anomalous feature among the plurality of features.

2. The computer-implemented method of claim 1, wherein the generating the pixel map comprises:
- superimposing images from the set of images over one another, and
- mapping pixel intensities to a reference intensity function to create an additive affect for similar intensities and negative affect for different intensities.

3. The computer-implemented method of claim 1, wherein the filtering the low intensity pixels out of the pixel map, further comprises:
- comparing an intensity of each pixel to a predetermined filter threshold; and
- removing any pixel with an intensity below the predetermined filter threshold from the pixel map to obtain the common feature template.

4. The computer-implemented method of claim 1, wherein the determining whether the difference in intensity exists between each pixel in each image and the same pixel in the common feature template, further comprises:
- comparing an intensity value of each pixel in each image to the same pixel in the common feature template, and
- determining that the difference in intensity exists between pixels when there is any difference in intensity value between the pixels.

5. The computer-implemented method of claim 1, wherein the determining whether the difference in intensity exists between each pixel in each image and the same pixel in the common feature template further comprises:
- comparing an intensity value of each pixel in each image to the same pixel in the common feature template,
- determining any difference in intensity value between the pixels,
- comparing any difference in intensity value between the pixels to a predetermined intensity threshold, and determining that the difference in intensity exists between the pixels when the difference in intensity value is greater than the predetermined intensity threshold.

6. The computer-implemented method of claim 1, wherein the determining whether the given feature is the common difference feature further comprises:

comparing a number of images having the given feature to the predetermined threshold number of the images.

7. A system comprising:

one or more processors; and one or more computer-readable media storing instructions which, when executed by the one or more processors, cause the one or more processors to perform operations including:

accessing a set of documents;

converting the set of documents to a set of images in a binary format;

generating a common feature template based on the set of images, wherein the generating includes:

generating a pixel map based on the set of images, and filtering low intensity pixels out of the pixel map to generate the common feature template;

comparing each image from the set of images to the common feature template to identify images with at least one anomalous feature, wherein the comparing each image includes:

determining whether a difference in intensity exists between each pixel in each image and a same pixel in the common feature template, counting each pixel in each image that is different in intensity from the same pixel in the common feature template, determining whether a count of pixels that are different in intensity for each feature among a plurality of features in each image is greater than a predetermined pixel count threshold, when the count of pixels that are different in intensity for a given feature of the plurality of features in the image is greater than the predetermined pixel count threshold, determining whether the given feature is a common difference feature in at least a predetermined threshold number of the images, in response to the determining that the given feature is the common difference feature in at least the predetermined threshold number of the images, filtering out the common difference feature from the images of the set of images, and in response to the determining that the given feature is not the common difference feature in at least the predetermined threshold number of the images, identifying the given feature as an anomalous feature; and outputting the images with the at least one anomalous feature among the plurality of features.

8. The system of claim 7, wherein the generating the pixel map further includes:

superimposing images from the set of images over one another, and mapping pixel intensities to a reference intensity function to create an additive affect for similar intensities and negative affect for different intensities.

9. The system of claim 7, wherein the filtering the low intensity pixels out of the pixel map further includes:

comparing an intensity of each pixel to a predetermined filter threshold; and removing any pixel with an intensity below the predetermined filter threshold from the pixel map to obtain the common feature template.

10. The system of claim 7, wherein the determining whether the difference in intensity exists between each pixel in each image and the same pixel in the common feature template further includes:

comparing an intensity value of each pixel in each image to the same pixel in the common feature template, and determining that the difference in intensity exists between pixels when there is any difference in intensity value between the pixels.

11. The system of claim 7, wherein the determining whether the difference in intensity exists between each pixel in each image and the same pixel in the common feature template, further includes:

comparing an intensity value of each pixel in each image to the same pixel in the common feature template, determining any difference in intensity value between the pixels, comparing any difference in intensity value between the pixels to a predetermined intensity threshold, and determining that the difference in intensity exists between the pixels when the difference in intensity value is greater than the predetermined intensity threshold.

12. The system of claim 7, wherein the determining whether the given feature is the common difference feature further includes:

comparing a number of images having the given feature to the predetermined threshold number of the images.

13. One or more non-transitory computer-readable media storing instructions which, when executed by one or more processors, cause the one or more processors to perform operations including:

accessing a set of documents;

converting the set of documents to a set of images in a binary format;

generating a common feature template based on the set of images, wherein the generating includes:

generating a pixel map based on the set of images, and filtering low intensity pixels out of the pixel map to generate the common feature template;

comparing each image from the set of images to the common feature template to identify images with at least one anomalous feature, wherein the comparing each image includes:

determining whether a difference in intensity exists between each pixel in each image and a same pixel in the common feature template, counting each pixel in each image that is different in intensity from the same pixel in the common feature template, determining whether a count of pixels that are different in intensity for each feature among a plurality of features in each image is greater than a predetermined pixel count threshold, when the count of pixels that are different in intensity for a given feature of the plurality of features in the image is greater than the predetermined pixel count threshold, determining whether the given feature is a common difference feature in at least a predetermined threshold number of the images, in response to the determining that the given feature is the common difference feature in at least the predetermined threshold number of the images, filtering out the common difference feature from the images of the set of images, and in response to the determining that the given feature is not the common difference feature in at least the predetermined threshold number of the images, identifying the given feature as an anomalous feature; and outputting the images with the at least one anomalous feature among the plurality of features.

14. The one or more non-transitory computer-readable media of claim 13, wherein the generating the pixel map further includes:

superimposing images from the set of images over one another, and mapping pixel intensities to a reference intensity function to create an additive affect for similar intensities and negative affect for different intensities.

15. The one or more non-transitory computer-readable media of claim 13, wherein the filtering the low intensity pixels out of the pixel map, further includes:

comparing an intensity of each pixel to a predetermined filter threshold; and removing any pixel with an intensity below the predetermined filter threshold from the pixel map to obtain the common feature template.

16. The one or more non-transitory computer-readable media of claim 13, wherein the determining whether the difference in intensity exists between each pixel in each image and the same pixel in the common feature template, further includes:

comparing an intensity value of each pixel in each image to the same pixel in the common feature template, and determining that the difference in intensity exists between pixels when there is any difference in intensity value between the pixels.

17. The one or more non-transitory computer-readable media of claim 13, wherein determining whether a difference in intensity exists between each pixel in each image and the same pixel in the common feature template, further includes:

comparing an intensity value of each pixel in each image to the same pixel in the common feature template, determining any difference in intensity value between the pixels, comparing any difference in intensity value between the pixels to a predetermined intensity threshold, and determining that the difference in intensity exists between the pixels when the difference in intensity value is greater than the predetermined intensity threshold.

18. The one or more non-transitory computer-readable media of claim 13, wherein the determining whether the given feature is the common difference feature further includes:

comparing a number of images having the given feature to the predetermined threshold number of the images.

19. The computer-implemented method of claim 1, further comprising:

prior to the generating the common feature template, performing image-morphing on the images of the set of images, to make text in the images bolder.

20. The computer-implemented method of claim 1, wherein the filtering the low intensity pixels further comprises:

comparing an intensity of each pixel to a predetermined filter threshold; and removing any pixel with an intensity below the predetermined filter threshold from the pixel map, wherein the predetermined filter threshold is dynamically determined based on a number of documents in the accessed set of documents.

* * * * *